No. 763,916. PATENTED JUNE 28, 1904.
I. W. LIVINGSTON.
CONDIMENT HOLDER.
APPLICATION FILED JULY 1, 1903.
NO MODEL.

WITNESSES:

INVENTOR
I. W. Livingston
BY
Victor J. Evans
Attorney

No. 763,916. Patented June 28, 1904.

UNITED STATES PATENT OFFICE.

IRA W. LIVINGSTON, OF MOUNDSVILLE, WEST VIRGINIA.

CONDIMENT-HOLDER.

SPECIFICATION forming part of Letters Patent No. 763,916, dated June 28, 1904.

Application filed July 1, 1903. Serial No. 163,944. (No model.)

*To all whom it may concern:*

Be it known that I, IRA W. LIVINGSTON, a citizen of the United States, residing at Moundsville, in the county of Marshall and State of West Virginia, have invented new and useful Improvements in Condiment-Holders, of which the following is a specification.

My invention has relation to new and useful improvements in condiment-holders of that character or type which comprise a receptacle or vessel constructed with a plurality of compartments adapted to hold different condiments and provided with a cover having an opening through which the contents of any one of compartments or a plurality of them may be discharged when desired; and the object of the invention is to provide a device of the character mentioned which is simple in construction and durable and efficient in use.

The invention consists in providing an outer inclosing vessel provided with a fixed cover formed with an opening, a condiment-holder proper having a plurality of compartments, said holder being rotatably mounted inside the outer inclosing vessel and provided with a cover having perforations therein communicating with the several compartments and a suitable device for rotating the holder to bring the perforations of a particular compartment in register with the opening in the cover of the outer vessel in order that the contents of such compartment may be discharged.

I have fully and clearly illustrated my invention in the accompanying drawings, forming a part of this specification, and wherein—

Figure 1:
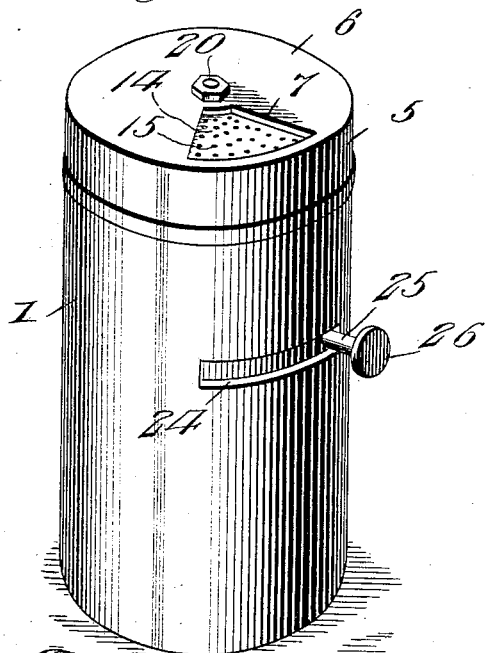
Figure 2:
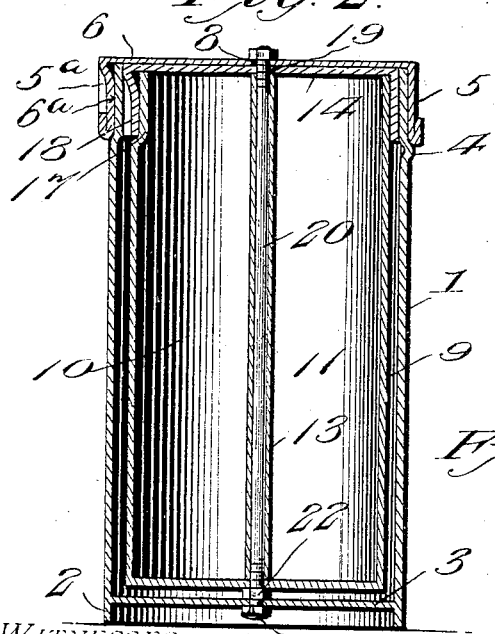
Figure 3:
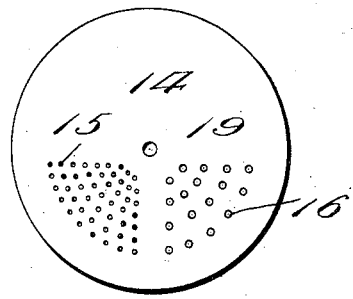
Figure 4:

Figure 1 is a perspective view of a condiment-holder embodying my invention. Fig. 2 is a longitudinal vertical central section through the invention. Fig. 3 is a top plan view of the cover for the inner receptacle for holding the various condiments, and Fig. 4 is a horizontal section through the shell and holder.

Referring to the drawings, 1 designates an outer vessel or shell, which is preferably cylindrical in form and of such material and size as may be desired. This shell 1 is formed or provided at its base portion with a circumferential depending flange 2, upon which the vessel rests and by means of which the bottom 3 of the vessel or shell 1 is held above and out of contact with the surface upon which it stands. At a point adjacent its upper portion the vessel is formed with an annular bead 4, against which the depending flange 5 of the cover 6 abuts when in position. This cover is provided with an opening 7, through which the contents of the inner receptacle are discharged, and also with a central opening 8, the purpose of which will be more fully stated hereinafter. The cover is held against movement on the shell by means of a projection $5^a$ on the flange 5, which is adapted to be seated in a groove $6^a$ in the upper edge of the shell.

Within the vessel 1 and concentric therewith is a cylindrical condiment-holder proper, 9, which is shown as divided into two compartments 10 11 by means of a transverse partition 12, extending diametrically through said holder. This partition is formed of two sheets of metal, each of which is provided with a central longitudinally-extending channel, which is preferably semicircular in cross-section, said plates being laid face to face and said channels coinciding throughout their entire length to provide a housing or bearing 13, extending centrally through the condiment-holder from top to bottom. This holder is provided with a removable flanged cap or closure 14, which is formed with separated sets of perforations 15 16, which are so arranged that each one of said sets is adapted to register with one of the compartments of the holder in order that the contents of such compartment may be discharged therefrom when the holder is inverted. In order that the cap or closure 14 will not be turned upon the holder and the sets of perforations thrown out of alinement with their respective compartments, I provide the holder at a point adjacent its upper edge with a vertically-extending groove or recess 17, which is adapted to receive a projection 18 formed upon the inner face of the flange of the cap. It will be seen that this groove and projection not only prevents rotary movement of the cap upon the holder, but also serves as a guide to enable the user of the holder to properly adjust the cap when filling the respective compartments. This cap is also provided with a central aperture 19, which is arranged to aline with the longitudinal axis of the housing 13 and also the central opening 8 in the closure for the outer receptacle.

Extending longitudinally through the housing 13 is a vertically-arranged headed pin 20, the head of which rests upon the upper face of the cap 6 and the shank of which is projected downwardly through the aperture 8 in the cover 6 and the opening 19 in the cap 14 and the lower end of which passes through the bottom of the vessel or shell 1 and is held in position by means of a bur 21, as shown in Fig. 2 of the drawings. Arranged upon the pin 20, between the bottom of the vessel or shell, is a spacing-washer 22, by means of which the bottom of the holder is held out of contact with the vessel. This pin 20 constitutes a shaft upon which the holder 9 is adapted to be rotated in order that the set of perforations covering the compartment containing the desired condiment may be brought into register with the opening 7 to permit of the contents of such compartment being discharged therefrom.

I will now describe the preferred means for rotating said holder in order to shift the compartments. Each of the plates comprising the partition for separating the holder into compartments is provided at points intermediate its ends with a horizontally-extending channel, said channels being adapted to coincide when the plates are placed face to face to provide a horizontally-projecting socket-piece 23, the end of which opens through the shell of the holder and terminates closely adjacent a horizontally-disposed slot 24, cut in the outer vessel 1. Threaded into or otherwise suitably secured in the socket-piece 23 is a finger-piece 25, which extends outwardly through the slot 24 and terminates in a head 26, by means of which the finger-piece is grasped to rotate the holder.

The slot 24 is of such a length that when the holder is rotated the finger-piece 25 is adapted to abut the ends of said slot to limit the rotary movement of said holder and to bring one of the sets of perforations 15 16 into registry with the opening 7 accordingly as said finger-piece abuts one or the other of the ends of the slot. The contents from both compartments may be discharged by shifting the finger-piece to a point midway the ends of the slot 24, so that a part of the perforations of each compartment will register with the opening 7.

It will be seen that the headed pin 20 not only serves as the shaft upon which the inner holder rotates, but also to hold all the parts in position when assembled and prevent their displacement with relation to each other.

When it is desired to replenish the contents of the compartments or to cleanse the holder, the nut 21 is removed from the lower end of the pin 20, and said pin is removed from its position by withdrawing it through the upper cap of the vessel 1, when the cap 6 may be removed. The finger-piece 25 is then withdrawn from the socket-piece 23, after which the inner holder may be removed from the outer vessel and its cover taken off for the purpose of filling the compartments. After the filling has been accomplished the cap 14 is replaced, the projection 18 and recess 17 being placed in engagement, the holder is inserted in the outer vessel 1, the vertical pin is inserted in the housing and secured in position, and the finger-piece is inserted in the socket-piece, after which the complete device is in condition for use.

Having thus fully described the invention, what I claim as new is—

1. A condiment-holder comprising an outer shell, provided with a cover having an opening, an inner holder divided into compartments by a division-plate, a housing extending centrally through the plate, a pin extending through the housing, and upon which the holder rotates, a cover for the holder having sets of openings registering with the compartments, and means to rotate the holder to bring said sets of openings into register with the opening in the cover of the shell.

2. A condiment-holder comprising an outer shell having a slot in the body thereof, and a cover having an opening, an inner holder rotatably mounted in the shell and divided into compartments by a division-plate, a cover for the holder having sets of openings in register with the compartments, a socket-piece formed in the division-plate, and a finger-piece in the socket and extending through the slot in the shell.

3. A condiment-holder comprising an outer shell having a slot in the body thereof, and a cover having an opening, an inner holder rotatably mounted in the shell, and divided into compartments by a division-plate, a cover for the holder having sets of openings in register with the compartments, a vertical central housing and a horizontal socket-piece in the division-plate, a pin extending through the housing upon which the holder rotates, and a finger-piece in the socket and projecting through the opening in the shell.

In testimony whereof I affix my signature in presence of two witnesses.

IRA W. LIVINGSTON.

Witnesses:
 FRANK A. SEDGWICK,
 A. R. COCHRAN.